United States Patent
Cho (10) Patent No.: US 12,145,611 B2
(45) Date of Patent: Nov. 19, 2024

(54) SYSTEM AND METHOD FOR SWITCHING CONTROL OF AUTONOMOUS VEHICLE

(71) Applicants: Hyundai Motor Company, Seoul (KR); Kia Corporation, Seoul (KR)

(72) Inventor: YongWoon Cho, Hwaseong-si (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 299 days.

(21) Appl. No.: 17/721,955

(22) Filed: Apr. 15, 2022

(65) Prior Publication Data

US 2023/0044145 A1 Feb. 9, 2023

(30) Foreign Application Priority Data

Aug. 9, 2021 (KR) .................. 10-2021-0104510

(51) Int. Cl.
*B60W 50/08* (2020.01)
*B60W 60/00* (2020.01)

(52) U.S. Cl.
CPC ...... *B60W 50/082* (2013.01); *B60W 60/0053* (2020.02); *B60W 2540/10* (2013.01); *B60W 2540/12* (2013.01); *B60W 2540/18* (2013.01); *B60W 2710/202* (2013.01)

(58) Field of Classification Search
CPC ........... B60W 50/082; B60W 60/0053; B60W 2540/10; B60W 2540/12; B60W 2540/18; B60W 2710/202
USPC ........................................................ 701/18
See application file for complete search history.

(56) References Cited

U.S. PATENT DOCUMENTS

| | | | | |
|---|---|---|---|---|
| 10,633,025 | B2* | 4/2020 | McGill | B60T 8/17 |
| 2012/0109483 | A1* | 5/2012 | O'Dea | B60T 8/1755 |
| | | | | 903/903 |
| 2018/0111616 | A1* | 4/2018 | Herb | B60W 10/184 |
| 2018/0229712 | A1* | 8/2018 | Shelton | B60W 10/113 |
| 2018/0257651 | A1* | 9/2018 | Kitagawa | B60W 30/188 |
| 2018/0345975 | A1* | 12/2018 | Hiwatashi | F02D 41/021 |
| 2018/0345976 | A1* | 12/2018 | Hiwatashi | F02P 5/15 |
| 2018/0345977 | A1* | 12/2018 | Hiwatashi | F02P 5/045 |

(Continued)

FOREIGN PATENT DOCUMENTS

| | | | | |
|---|---|---|---|---|
| CN | 109689465 A | * | 4/2019 | B60K 28/06 |
| CN | 110291570 A | * | 9/2019 | B60W 40/12 |

(Continued)

*Primary Examiner* — Atul Trivedi
(74) *Attorney, Agent, or Firm* — Morgan, Lewis & Bockius LLP (57) ABSTRACT

A method of switching a control right according to a driving mode of a vehicle in a control right switching system operated by at least one processor is provided. Upon receiving a command to switch a driving mode of a vehicle being in any one driving mode of a manual driving mode or an autonomous driving mode, a torque value of a control unit that controls the vehicle according to a current driving mode of the vehicle is initialized. Furthermore, after transferring a driving mode control right of the vehicle from a vehicle to a driver or from the driver to the vehicle by increasing or reducing a vehicle control right to control the vehicle, whether to switch the driving mode is determined through monitoring information obtained by the control unit in the vehicle whose driving mode was switched during a predetermined time period.

15 Claims, 7 Drawing Sheets

(56) References Cited

U.S. PATENT DOCUMENTS

| | | | | |
|---|---|---|---|---|
| 2019/0092389 A1* | 3/2019 | McGill | ............... | B62D 1/22 |
| 2019/0375428 A1* | 12/2019 | Aoi | ............... | B60W 60/0059 |
| 2020/0001889 A1* | 1/2020 | Niu | ............... | B60W 10/20 |
| 2020/0001891 A1* | 1/2020 | Takano | ............... | B60W 50/00 |
| 2020/0010089 A1* | 1/2020 | Ford | ............... | F02D 41/0087 |
| 2020/0039584 A1* | 2/2020 | Igarashi | ............... | B62D 1/286 |
| 2022/0204016 A1* | 6/2022 | Lerner | ............... | B60W 60/0059 |

FOREIGN PATENT DOCUMENTS

| | | | | | |
|---|---|---|---|---|---|
| CN | 112236348 A | * | 1/2021 | ......... | B60W 30/182 |
| CN | 113561984 A | * | 10/2021 | ......... | B60W 30/095 |
| GB | 2557721 A | * | 6/2018 | ............ | B60W 10/04 |
| KR | 10-2014-0043536 A | | 4/2014 | | |
| WO | WO-2021083751 A1 | * | 5/2021 | ............ | B60T 8/1755 |

\* cited by examiner

SYSTEM AND METHOD FOR SWITCHING CONTROL OF AUTONOMOUS VEHICLE

CROSS-REFERENCE TO RELATED APPLICATION

The present application claims priority to Korean Patent Application No. 10-2021-0104510 filed on Aug. 9, 2021, the entire contents of which is incorporated herein for all purposes by this reference.

BACKGROUND OF THE PRESENT DISCLOSURE

Field of the Present Disclosure

The present disclosure relates to a control right switching system and method for changing a driving mode of an autonomous vehicle for driver adaptation to an autonomous driving mode and a manual driving mode.

Description of Related Art

Many technologies have been applied to autonomous vehicles. For example, lane keeping assist (LKA), which prevents a vehicle from leaving its lane while driving, and smart cruise control (SCC), which controls the speed of a vehicle to maintain an appropriate distance from a vehicle in front are applied.

However, there is a limit to realize full autonomous driving because it is difficult to completely recognize the surrounding environments, such as weather, busy road conditions, construction sites, and unpaved roads without lanes. To minimize the instability of the autonomous vehicle as described above, a manual driving mode in which a driver drives in person is required. Furthermore, it is necessary to interchange between the autonomous driving mode and the manual driving mode.

A dedicated switch provided in the vehicle or a method for recognizing the voice uttered by the driver is used for changing the current driving mode of the autonomous vehicle. That is, when the driver presses the dedicated switch or utters a driving mode switching command, the vehicle receives signals due to the driver's actions and then transfer a control right for each function of a control unit (e.g., a steering wheel, an accelerator pedal, a brake pedal) sequentially by module from the driver to the vehicle and vice versa.

At the present time, the driver may not recognize the sensitivity of the control unit, which makes the driver be confused momentarily and may cause an accident. Therefore, it is required to supplement the stability of the driving mode switching technology.

The information disclosed in this Background of the present disclosure section is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a system and method for switching a control right of an autonomous vehicle that minimizes sense of difference caused by driving mode switching between an autonomous driving mode and a manual driving mode and allows a driver to easily adapt to driving.

A method of switching a control right according to a driving mode of a vehicle in a control right switching system operated by at least one processor may include receiving a command to switch a driving mode of a vehicle being in any one driving mode of a manual driving mode or an autonomous driving mode, initializing a torque value of a control unit that controls the vehicle according to a current driving mode of the vehicle, transferring a driving mode control right of the vehicle from a vehicle to a driver or from the driver to the vehicle by increasing or reducing a vehicle control right to control the vehicle, and monitoring information obtained by the control unit in the vehicle whose driving mode was switched during a predetermined time period, and determining whether to switch the driving mode.

Initializing the torque value may include determining whether the current driving mode of the vehicle is the autonomous driving mode, and initializing a manual driving control unit that controls driving of the vehicle in the manual driving mode when it is determined that the current driving mode is the autonomous driving mode. Here, the manual driving control unit may include a motor driven power steering (MDPS), an accelerator position sensor (APS) and a brake position sensor (BPS).

The initializing the manual driving control unit may include initializing a torque of the MDPS to a heaviest torque and initializing a torque of the APS and the BPS to a torque of a state where the driver does not press down the brake pedal or the accelerator pedal of the vehicle.

Transferring the driving mode control right may include reducing the vehicle control right.

Reducing the vehicle control right may include reducing a torque of a steering wheel from a maximum value to a torque of the manual driving mode during a predetermined time period by the MDPS, and increasing a torque of an accelerator pedal or a brake pedal from a minimum value to the torque in the manual driving mode during the predetermined time period by the APS and the BPS.

The method may further include initializing a torque of the MDPS to a heaviest torque and initializing a torque of the APS and the BPS to a torque of a state where the driver does not press down a brake pedal or an accelerator pedal of the vehicle, when the at least one processor concludes that the current driving mode is the manual driving mode.

Transferring the driving mode control right may include increasing the vehicle control right.

The MDPS may increase a torque of a steering wheel from a torque in the manual driving mode to a maximum value during a predetermined time period, and the APS and the BPS may decrease a torque of an accelerator pedal or a brake pedal from the torque in the manual driving mode to a minimum value during the predetermined time period.

Monitoring information may further include monitoring a first torque value of the control unit extracted from a communication signal in the autonomous driving mode and a second torque value of the control unit extracted from a signal generated according to the vehicle driving by the driver.

Monitoring information may include finalizing switching the driving mode of the vehicle when a difference between the first torque value and the second torque value is less than or equal to a predetermined value.

According to an exemplary embodiment of the present disclosure, because the control right is controlled to be transferred naturally during a predetermined time period, the driver can safely switch driving mode and easily adapt to driving mode switching.

Furthermore, because the control right is switched using an electronic control unit mounted on the existing vehicle, a large amount of cost is not required for developing a system for switching a control right.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

It may be understood that the appended drawings are not necessarily to scale, presenting a somewhat simplified representation of various features illustrative of the basic principles of the present disclosure. The specific design features of the present disclosure as disclosed herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

In the following detailed description, only certain example embodiments of the present disclosure have been shown and described, simply by way of illustration. As those skilled in the art would realize, the described embodiments may be modified in various different ways, all without departing from the spirit or scope of the present disclosure. Accordingly, the drawings and description are to be regarded as illustrative in nature and not restrictive. Like reference numerals designate like elements throughout the specification.

In the description, when a part is referred to "include" or "comprise" a certain component, it means that it may further include other components rather than exclude other elements, unless specifically indicates otherwise.

Hereinafter, a system and method for switching control right of an autonomous vehicle according to an exemplary embodiment of the present disclosure is described with reference to the accompanying drawings. Prior to describing an exemplary embodiment of the present disclosure, a method for changing driving mode of a conventional autonomous vehicle is described with reference to FIG. 1.

Figure 1:
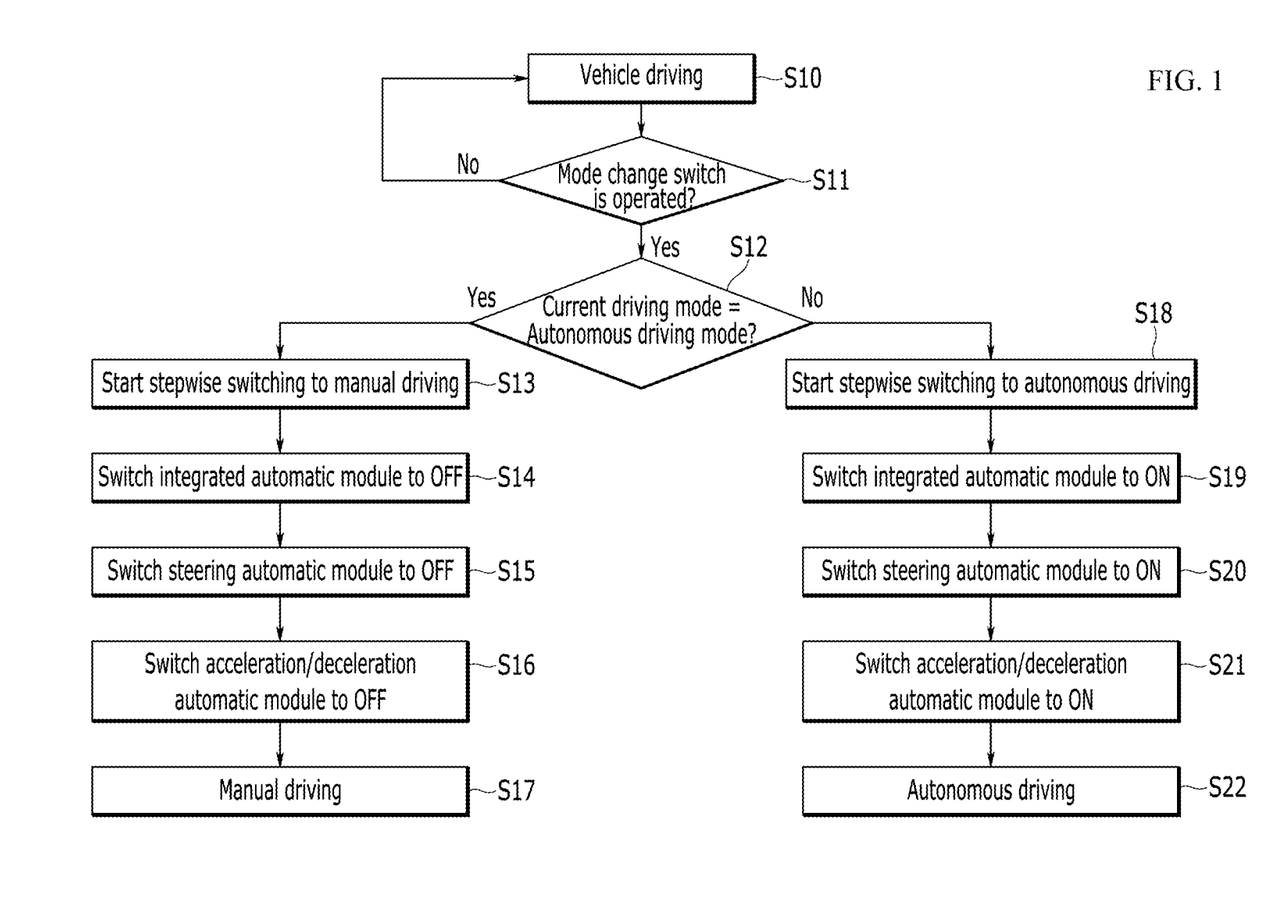
FIG. 1 is a flowchart illustrating a method of switching driving mode of a conventional autonomous vehicle.

FIG. 1 is a flowchart illustrating a method of switching driving mode of a conventional autonomous vehicle.

As shown in FIG. 1, the autonomous vehicle is provided with an autonomous driving mode and a manual driving mode. To switch the driving mode of the conventional autonomous vehicle, a driver presses a mode change switch or commands the vehicle to switch the driving mode via voice recognition technology and the like while driving (S10).

A processor in charge of switching the driving mode of the vehicle checks whether the mode change switch is operated (S11). When the driver utters a voice command to switch the driving mode of the vehicle, the processor may process the voice uttered by the driver and determine whether the voice includes a command to switch the driving mode.

When the mode change switch is pressed or the driver uttered a command to switch the driving mode, the processor is configured to check whether current driving mode of the vehicle is the autonomous driving mode (S12).

If it is determined that the current driving mode of the vehicle is the autonomous driving mode, the processor is configured to control a switching procedure to the manual driving mode for transferring a control right of each function of a control unit sequentially by module from the vehicle to the driver (S13). Furthermore, if it is determined that the current driving mode of the vehicle is the manual driving mode, the processor is configured to control a switching procedure to the autonomous driving mode for transferring a control right of each function of the control unit sequentially by module from the driver to the vehicle (S18).

That is, when a request for switching from the autonomous driving mode to the manual driving mode is input, an integrated automatic module that performs various functions implementing autonomous driving of vehicle is switched from ON state to OFF state first (S14). Accordingly, a steering automatic module is switched from the ON state to the OFF state (S15), and an acceleration/deceleration automatic module is switched from the ON state to the OFF state (S16). By switching sequentially these modules from the ON state to the off state, the vehicle is switched to a manual driving mode facilitating the user to operate (S17).

Meanwhile, when it is determined that the current driving mode is the manual driving mode at step S12, the integrated automatic module that performs various functions implementing autonomous driving of the vehicle is switched from the OFF state to the ON state first (S19). Accordingly, the steering automatic module is switched from the OFF state to the ON state (S20), and the acceleration/deceleration automatic module is switched from the OFF state to the ON state (S21). By switching sequentially these modules for autonomous driving from the OFF state to the on state, the vehicle is switched to the autonomous driving mode facilitating autonomous driving (S22).

Here, the control unit includes operating devices required for the driver to drive in person, such as a steering wheel, an accelerator pedal, and a brake pedal. At the instant time, the driver who does not recognize a sensitivity of the control unit according to driving mode switching by the control unit may be momentarily nervous due to the sense of difference caused by the mode switching.

Therefore, in an exemplary embodiment of the present disclosure, a control right is adjusted with the sensitivity that the user can directly sense switching of the control right upon switching the control right. As a result, it may be prevented from the driver to feel the difference, facilitating a safe driving mode switching.

Figure 2:
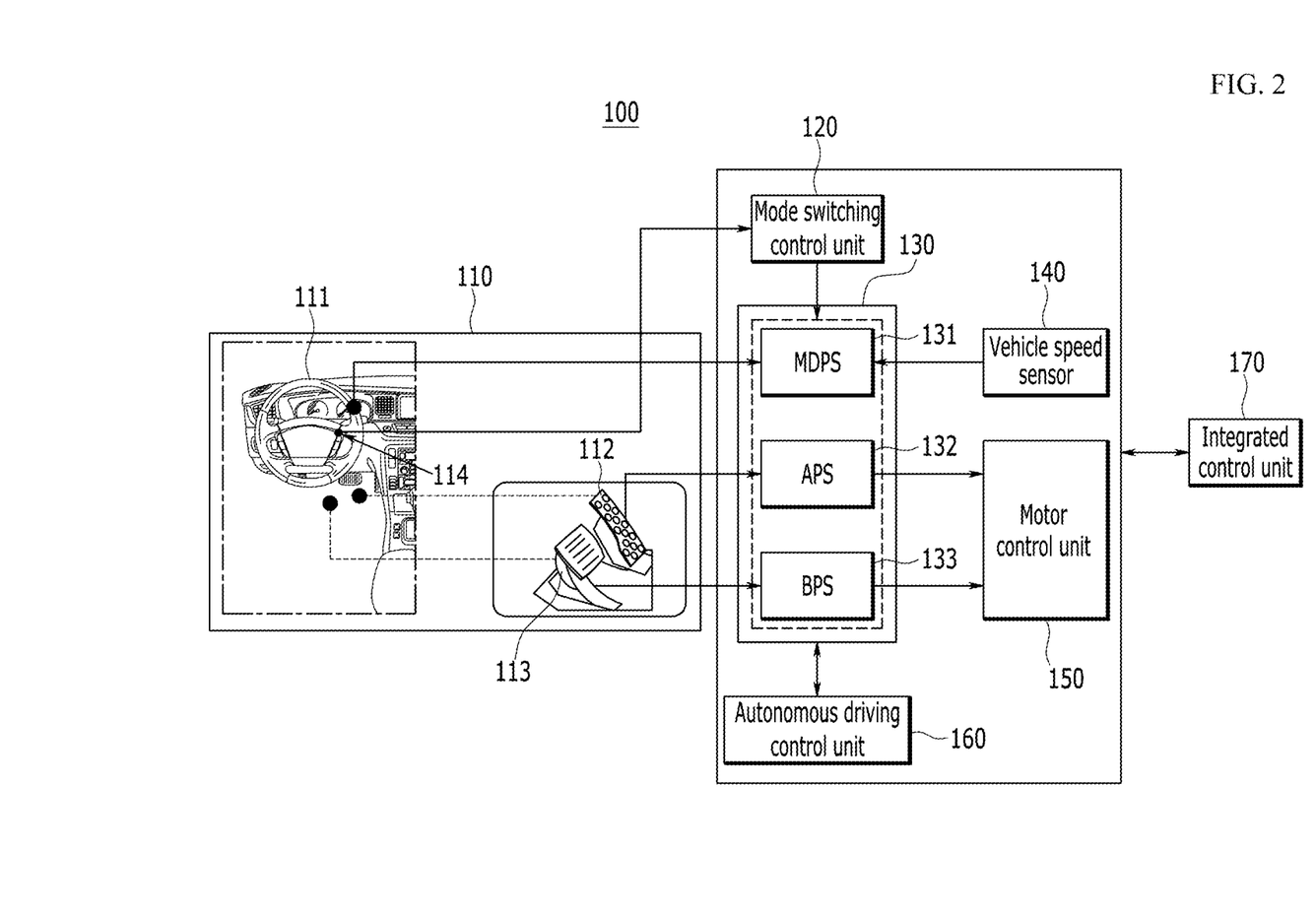
FIG. 2 is a schematic diagram of a control right switching system according to an exemplary embodiment of the present disclosure.

FIG. 2 is a schematic diagram of a control right switching system according to an exemplary embodiment of the present disclosure.

As shown in FIG. 2, a control right switching system 100 includes an interface 110, a mode switching control unit 120, a manual driving control unit 130, a vehicle speed sensor 140, a motor control unit 150, and an autonomous driving control unit 160. Furthermore, the control right switching system 100 may further include an integrated control unit 170.

The interface 110 is a component operated by a driver. In the exemplary embodiment of the present disclosure, it is exemplified that the interface 110 includes a steering wheel 111, an accelerator pedal 112, a brake pedal 113, and a mode switching button 114.

The mode switching control unit 120 identifies a current driving mode of a vehicle. Because there are various methods for the mode switching control unit 120 to identify the current driving mode of the vehicle, it is not limited to any one method in an exemplary embodiment of the present disclosure.

When the driver presses the mode switching button 114 or utters a command for driving mode switching, the mode switching control unit 120 receives it as a driving mode switching command signal.

At the present time, the mode switching control unit 120 may receive the command for driving mode switching uttered by the driver and extracts the received command as the driving mode switching command signal through speech processing. In the instant case, the mode switching control unit 120 can perform a function of processing a voice signal uttered by the driver.

The method for extracting the driving mode switching command signal by processing the voice signal in the mode switching control unit 120 may be implemented with various methods. Thus, it is not limited to any one method in an exemplary embodiment of the present disclosure. Alternatively, the mode switching control unit 120 may receive an externally processed result as the driving mode switching command signal.

Upon receiving the driving mode switching command signal, the mode switching control unit 120 determines whether the current driving mode is the autonomous driving mode or the manual driving mode. There are various methods for the mode switching control unit 120 to determine the current driving mode of the vehicle. Thus, it is not limited to any one method in an exemplary embodiment of the present disclosure.

The mode switching control unit 120 generates a control signal for controlling the manual driving control unit 130 and the autonomous driving control unit 160, based on the determined current driving mode and the driving mode switching command signal.

The manual driving control unit 130 is described as including a motor driven power steering (MDPS) 131, an accelerator position sensor (APS) 132, and a brake position sensor (BPS) 133. In an exemplary embodiment of the present discourse, only the MDPS 131, the APS 132, and the BPS 133 are shown for convenience of description. However, the present disclosure is not limited thereto.

Furthermore, it is described that the autonomous driving control unit 160 includes the same components as the manual driving control unit 130.

The manual driving control unit 130 controls steering, acceleration, deceleration, and the like of the vehicle by operating the steering wheel, the accelerator pedal, the brake pedal, and the like according to the recognition/determination of the driver. Furthermore, the autonomous driving control unit 160 automatically controls steering, acceleration, deceleration, and the like of the vehicle, based on sensor modules such as a camera, a radar, and a Light Detection and Ranging (LiDAR), and information such as route information of an input destination, road information, and nearby vehicle information.

The MDPS 131 adjusts steering sensitivity for the driver to control the steering wheel 111 according to the driving speed of the vehicle measured by the vehicle speed sensor 140. For example, when the driving speed of the vehicle is low, the MDPS 131 lightens the steering sensitivity so that the driver can easily control the steering wheel. On the other hand, when the driving speed of the vehicle is high, the MDPS 131 weights the steering sensitivity to prevent the driver from suddenly changing direction thereof.

The APS 132 measures a torque value when the driver presses down the accelerator pedal 112. Accordingly, the APS 132 transfers the measured torque value to the motor control unit 150 to increase the driving speed of the vehicle.

The BPS 123 measures a torque value when the driver presses down the brake pedal. Accordingly, the BPS 123 transfers the measured torque value to the motor control unit to reduce the driving speed of the vehicle.

The MDPS 131, the APS 132, and the BPS 133 initialize the torque according to a mode switching control signal received from the mode switching control unit 120, and switches the vehicle driving mode from the autonomous driving mode to the manual driving mode or vise versa by reducing or increasing a vehicle control right.

In an example of switching from the autonomous mode to the manual driving mode, the MDPS 131 of the manual driving control unit 160 initializes to a maximum torque representing a state in which the driver is not involved in operating the steering wheel, according to the mode switch control signal. The MDPS 131 initializes a torque of the steering wheel to a maximum set value representing a state where it is difficult for the driver to intervene the steering operation. Accordingly, the MDPS 131 makes the torque of the steering wheel become the same as a torque value of the manual driving mode by gradually reducing the torque of the steering wheel during a predetermined time period for mode switching.

The APS 132 and the BPS 133 of the manual driving control unit 160 initialize to a torque representing a state where the driver does not press down the brake pedal or the accelerator pedal. Furthermore, the autonomous driving control unit 150 increases torques of the APS and the BPS from a minimum value to the torque in the manual driving mode during a predetermined time period.

Oppositely, when switching from the manual driving mode to the autonomous driving mode, the autonomous driving control unit 160 initializes the MDPS, APS, and BPS to a state where the MDPS, APS, and BPS do not give an additional torque effect on the vehicle operation of the driver. That is, the vehicle control right is gradually transferred starting from a state the same as the manual driving mode.

On the other hand, in a process of increasing the vehicle control right to make the vehicle get into the autonomous driving mode, the autonomous driving control unit 150 gradually increases the torque value of the MDPS from that of the manual driving mode to the maximum value during a predetermined time period, and gradually decreases the torque values of the APS and BPS from those of the manual driving mode to the minimum value during the predetermined time period.

The vehicle speed sensor 140 detects the vehicle speed. Because the method for detecting the vehicle speed by the vehicle speed sensor 140 is a previously known technology, detailed description is omitted in an exemplary embodiment of the present disclosure.

The motor control unit 150 controls a motor by reflecting the torques of the APS 132 and the BPS 133 of the manual driving control unit 150.

To finalize switching operation of each driving mode, the integrated control unit 170 monitors driving state of the vehicle during a predetermined time period and determines the transfer and withdrawal of the control right. The integrated control unit 170 determines an appropriate control input value of the driver by use of a CAN communication signal in the vehicle to monitor for the final mode switching. Here, a value detected by a steering angle sensor, an accelerator pedal value, a brake switch state signal, and the like may be used as the CAN communication signal.

The integrated control unit 170 monitors a difference between the CAN communication signal in the autonomous driving mode and a signal input from vehicle driving by the driver during a predetermined time period (e.g., 1 min). Accordingly, only when a deviation of the two signals falls within a predetermined range (e.g., ±1%), mode switching is finalized.

A method for the above-described control right switching system 100 to switch a driving mode of an autonomous vehicle is described with reference to FIG. 3.

Figure 3:
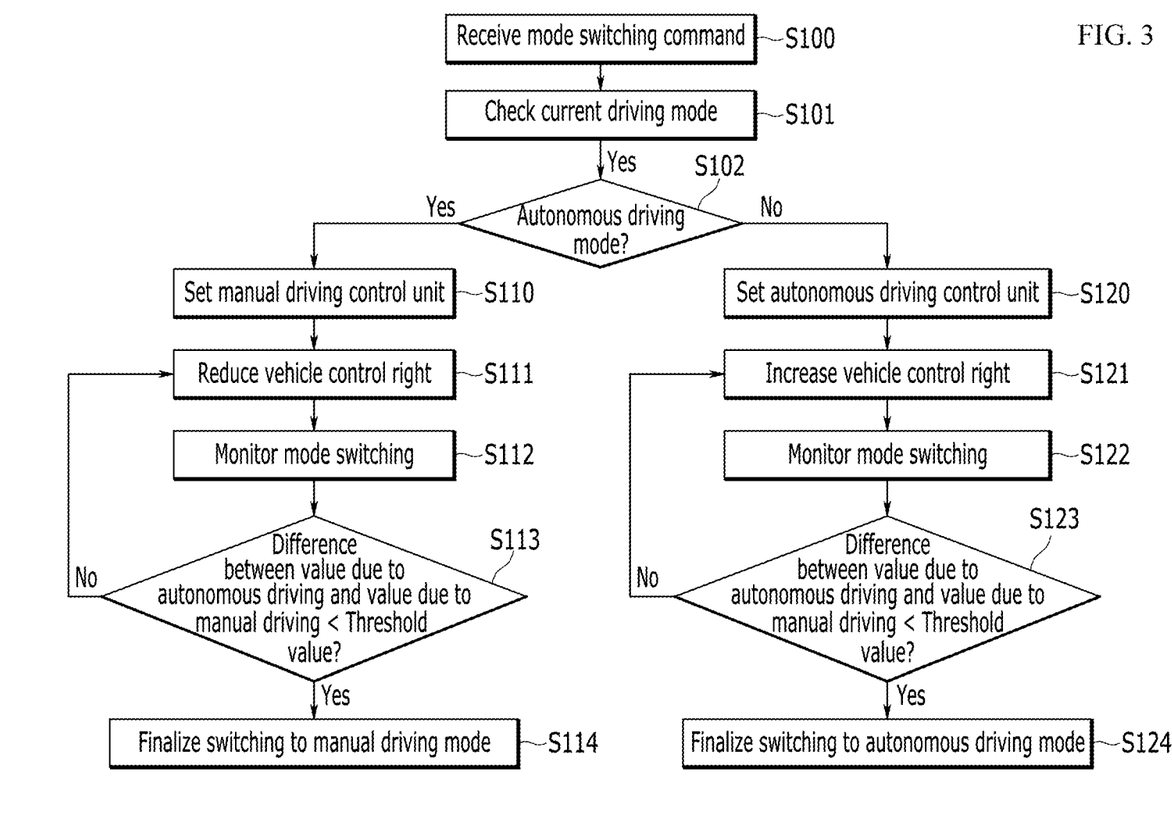
FIG. 3 is a flowchart showing a method of switching a driving mode of an autonomous vehicle according to an exemplary embodiment of the present disclosure.

FIG. 3 is a flowchart showing a method of switching a driving mode of an autonomous vehicle according to an exemplary embodiment of the present disclosure.

As shown in FIG. 3, when a driver makes a mode switching command by pressing a mode switching button 114 or uttering a command to switch a driving mode, a control right switching system 100 receives the mode switching command (S100). For convenience of description, pressing the mode switching button 114 is used as an example in an exemplary embodiment of the present disclosure. However, when the driver utters the command, a procedure for processing voice uttered by the driver may be performed concomitantly.

Upon receiving the mode switching command, the control right switching system 100 checks whether a current driving mode of the vehicle is an autonomous driving mode or a manual driving mode (S101). Accordingly, the control right switching system 100 checks whether the vehicle is operated in the autonomous driving mode currently (S102).

If it is determined that the vehicle is operated in the autonomous driving mode, the control right switching system 100 sets the manual driving control unit 130 (S110).

That is, the control right switching system 100 sets the MDPS 131 to operate with the heaviest torque for the driver to control a steering wheel. Furthermore, the APS 132 or the BPS 133 is set to a torque representing a state where the driver does not press down the brake pedal or the accelerator pedal.

Here, a torque ($\tau_{MDPS}$) of the MDPS 131 and a torque ($V_{PS}$) of the APS or the BPS, which are set by the control right switching system 100 during initializing the manual driving control unit 130, are expressed as shown in Equation 1.

$$\tau_{MDPS} = \tau_{MDPS} + \Delta Th_\tau = \tau_{MDPS} + \tau_{max} = \tau_{max}$$

$$V_{PS} = V_{PS} - \Delta Th_V = V_{PS} - V_{max} = 0 \quad \text{Equation 1}$$

Here, $\tau_{MDPS}$ is the torque of the MDPS according to the vehicle speed sensor 140, and $\tau_{max}$ is the maximum value of $\tau_{MDPS}$, which is the heaviest torque for the driver to control the steering wheel. $\Delta Th_\tau$ is a threshold value for controlling the torque of the MDPS.

$V_{PS}$ is a sensor value of the APS and the BPS, which is obtained through measuring the torque caused by actually pressing down the pedal by the driver. $V_{max}$ is the maximum value of $V_{PS}$, which is the sensor value when the pedal is fully pressed. $\Delta Th_V$ is a threshold value to control the sensor value.

Here, ranges of $\tau_{MDPS}$ and $V_{PS}$ are $0 \leq \tau_{MDPS} \leq \tau_{max}$ and $0 \leq V_{PS} \leq V_{max}$, respectively.

When the vehicle is switched from the autonomous driving mode to the manual driving mode or vice versa, the manual driving control unit 130 and the autonomous driving control unit 160 set the torque ($\tau_{MDPS}$) of the MDPS as $\tau_{MDPS} + \Delta Th_\tau$. The sensor value of the APS or the BPS is set as $V_{PS} - \Delta Th_V$.

When the setting of the manual driving control unit 130 is completed, the control right switching system 100 reduces the vehicle control right (S111). That is, for the MDPS, the autonomous driving control unit 130 reduces the torque of the steering wheel from the maximum value to a torque in the manual driving mode during a predetermined time period. Furthermore, for the APS or the BPS, the torque is gradually increased from the minimum value to the torque in the manual driving mode during the predetermined time period.

After setting the manual driving control unit and reducing the vehicle control right as described above, the integrated control unit 170 of the control right switching system 100 monitors the mode switching from the autonomous driving mode to the manual driving mode during a predetermined time period (S112). After monitoring, the integrated control unit 170 determines whether a difference between a value of the CAN communication signal in the autonomous driving mode and a value of a signal generated according to vehicle driving by the driver is less than or equal to a predetermined threshold value (S113). That is, a difference between a torque value of the autonomous driving control unit 160 extracted from the CAN communication signal in the autonomous driving mode and a torque value of the manual driving control unit 130 extracted from the signal generated according to vehicle driving by the driver is monitored.

When the difference between the two signal values is greater than the threshold value, the process of mode switching monitoring in step S112 is repeated. However, when the difference between the two signal values is less than or equal to the threshold value, switching to the manual driving mode is finalized (S114).

Meanwhile, when it is determined that the current driving mode is the manual mode in step S102, the control right switching system 100 initializes the autonomous driving control unit to be in the same state as the manual mode, where the MDPS, APS, and BPS do not give any additional torque effect to the driver's vehicle operation. That is, the control right switching system 100 performs the mode switching so that the MDPS, APS, and BPS is controlled by the autonomous driving control unit not by the driver's operation during the predetermined time period through transferring the vehicle control right from the driver gradually.

The control right switching system 100 increases the vehicle control right (S121). That is, for the MDPS, the autonomous driving control unit 130 gradually increases the torque of the steering wheel from the torque in the manual driving mode to the maximum value during a predetermined time period. Furthermore, for the APS or BPS, the torque of the brake pedal or the accelerator pedal is gradually reduced from the torque in the manual driving mode to the minimum value during the predetermined time period.

After increasing the vehicle control right as described above, the integrated control unit 170 of the control right switching system 100 monitors mode switching from the autonomous driving mode to the manual driving during a predetermined time period (S122). After monitoring, the integrated control unit 170 determines whether a difference between the value of the CAN communication signal in the autonomous driving mode and the value of a signal generated according to vehicle driving by the driver is less than or equal to the predetermined threshold value (S123).

When the difference between the two signal values is greater than the threshold value, the monitoring process of mode switching in step S122 is repeated. However, when the difference between the two signal values is less than or equal to the threshold value, switching to the autonomous driving mode is finalized (S124).

Here, initial values of the threshold values according to the mode switching are as shown in Table 1.

TABLE 1

| Driving mode | $\Delta Th\tau$ | $\Delta ThV$ |
|---|---|---|
| Autonomous driving → Manual driving | $\tau max$ | $Vmax$ |
| Manual driving → Autonomous driving) | 0 | 0 |

Hereinafter, an example representing a change in threshold value according to mode switching is described with reference to FIG. 4 and FIG. 5.

FIG. 4 is an example diagram of graphs representing changes in threshold values upon switching from autonomous driving to manual driving according to an exemplary embodiment of the present disclosure. FIG. 5 is an example diagram of graphs showing changes in threshold values upon switching from manual driving to autonomous driving according to an exemplary embodiment of the present disclosure.

Figure 4A:
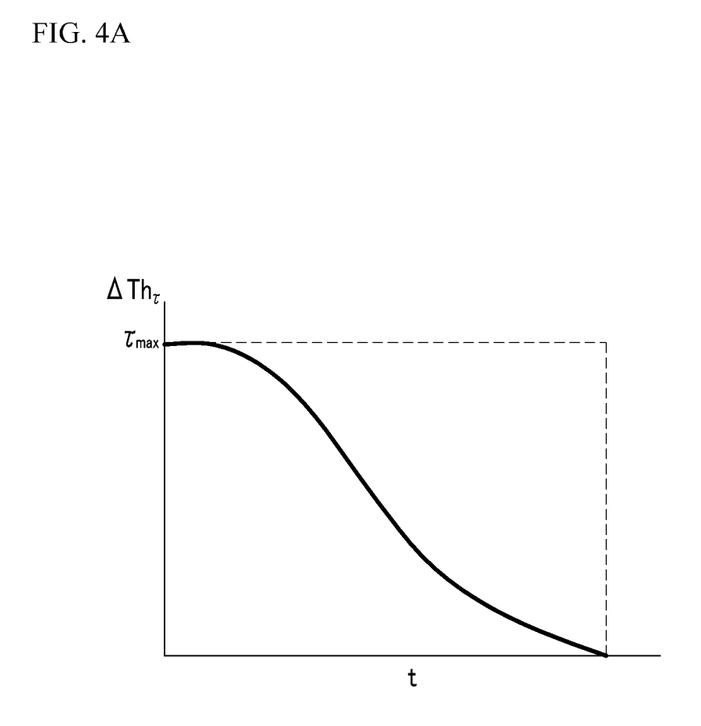
FIG. 4A and FIG. 4B are example diagrams of graphs representing changes in threshold values upon switching from autonomous driving to manual driving according to an exemplary embodiment of the present disclosure.
Figure 4B:
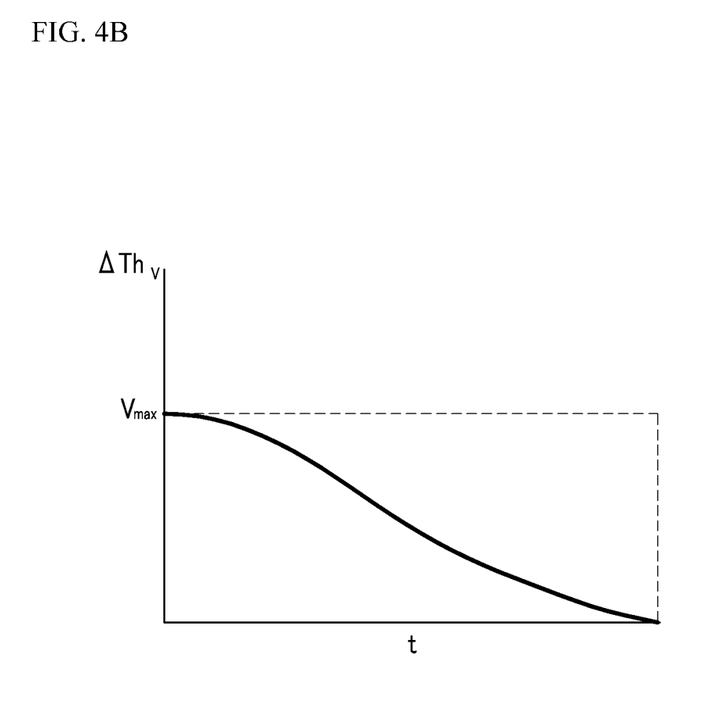

First, from FIG. 4A and FIG. 4B showing changes of $\Delta Th_\tau$ and $\Delta Th_V$ during a predetermined time period (t), it may be seen that $\Delta Th_\tau$ and $\Delta Th_V$ gradually approach 0 from the maximum value. When values of $\Delta Th_\tau$ and $\Delta Th_V$ become 0, values of $\tau_{MDPS}$ and $V_{PS}$ are expressed as in Equation 2.

$$\tau_{MDPS}=\tau_{MDPS}+\Delta Th_\tau=\tau_{MDPS}+0=\tau_{MDPS}$$

$$V_{PS}=V_{PS}-\Delta Th_V=V_{PS}-0=V_{PS} \qquad \text{Equation 2}$$

That is, the MDPS, APS, and BPS are controlled as to be in a normal manual driving state.

In an exemplary embodiment of the present invention, $\Delta Th_\tau$ and $\Delta Th_V$ and time period (t) have relation of an inverse sigmoid function.

Similarly, when the integrated control unit 170 monitors during a predetermined time period and finalizes transfer of the control right, it is informed that the control right is transferred through Audio, Video, Navigation (AVN).

Figure 5A:
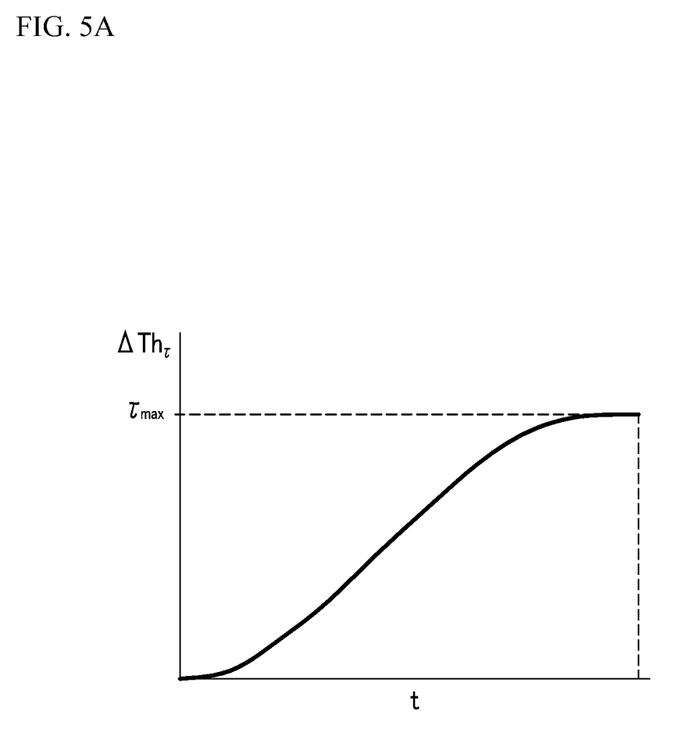
FIGS. 5A and 5B are example diagrams of graphs showing changes in threshold values upon switching from manual driving to autonomous driving according to an exemplary embodiment of the present disclosure.
Figure 5B:
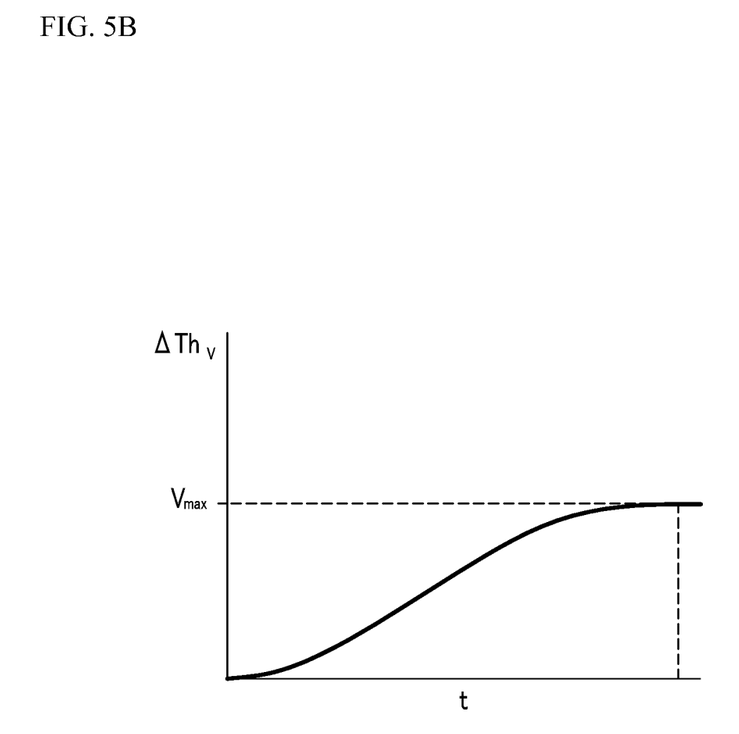

First, from FIG. 5A and FIG. 5B showing changes of $\Delta Th_\tau$ and $\Delta Th_V$ during a predetermined time period (t), it may be seen that $\Delta Th_\tau$ and $\Delta Th_V$ gradually approach the maximum value from 0. Furthermore, when these values become $\tau_{max}$ and $V_{max}$, respectively, the values of $\tau_{MDPS}$ and $V_{PS}$ are as shown in Equation 3.

$$\tau_{MDPS}=\tau_{MDPS}+\Delta Th_\tau=\tau_{MDPS}+\tau_{max}=\tau_{max}$$

$$V_{PS}=V_{PS}-\Delta Th_V=V_{PS}-V_{max}=0 \qquad \text{Equation 3}$$

That is, the vehicle is controlled to be in the normal autonomous driving state where the MDPS, APS, and BPS are not controlled by the driver's operation.

In an exemplary embodiment of the present invention, $\Delta Th_\tau$ and $\Delta Th_V$ and time period (t) have relation of a sigmoid function.

As described above, a control right switching system 100 according to an exemplary embodiment of the present disclosure makes a driver safely switch driving mode and easily adapt by controlling the control right to be transferred naturally during a predetermined time period.

A memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by multiple control devices, or an integrated single control device.

In various exemplary embodiments of the present disclosure, the control device may be implemented in a form of hardware or software, or may be implemented in a combination of hardware and software.

Furthermore, the terms such as "unit", "module", etc. Included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A method of switching a control right according to a driving mode of a vehicle in a control right switching system operated by at least one processor, the method comprising:
    receiving, by the at least one processor, a command to switch the driving mode of the vehicle being in one of a manual driving mode or an autonomous driving mode;
    initializing, by the at least one processor, a torque value of a control unit that controls the vehicle according to a current driving mode of the vehicle;
    transferring, by the at least one processor, a driving mode control right of the vehicle from the vehicle to a driver or from the driver to the vehicle by increasing or reducing a vehicle control right to control the vehicle; and
    monitoring, by the at least one processor, information obtained by the control unit in the vehicle whose driving mode was switched during a predetermined time period, and determining, by the at least one processor, whether to switch the driving mode,
    wherein the initializing the torque value includes:
        determining whether the current driving mode of the vehicle is the autonomous driving mode,
        initializing a manual driving control unit that controls driving of the vehicle in the manual driving mode when the at least one processor concludes that the current driving mode is the autonomous driving mode, wherein the manual driving control unit includes a motor driven power steering (MDPS), an accelerator position sensor (APS) and a brake position sensor (BPS), and
        initializing a torque of the MDPS to a heaviest torque and initializing a torque of the APS and the BPS to a torque of a state where the driver does not press down a pedal, when it is determined that the current driving mode is the manual driving mode.

2. The method of claim 1, wherein the initializing the manual driving control unit includes initializing a torque of the MDPS to a heaviest torque and initializing a torque of the APS and the BPS to a torque of a state where the driver does not press down a brake pedal or an accelerator pedal of the vehicle.

3. The method of claim 2, wherein the transferring the driving mode control right includes reducing the vehicle control right.

4. The method of claim 3, wherein the reducing the vehicle control right includes:
    reducing a torque of a steering wheel from a maximum value to a torque of the manual driving mode during a predetermined time period by the MDPS, and
    increasing a torque of the accelerator pedal or the brake pedal from a minimum value to the torque in the manual driving mode during the predetermined time period by the APS and the BPS.

5. The method of claim 1, wherein the transferring the driving mode control right includes increasing the vehicle control right.

6. The method of claim 5, wherein the MDPS is configured to increase a torque of a steering wheel from a torque in the manual driving mode to a maximum value during a predetermined time period, and the APS and the BPS are configured to decrease a torque of an accelerator pedal or a brake pedal from the torque in the manual driving mode to a minimum value during the predetermined time period.

7. The method of claim 1, wherein the monitoring the information further includes monitoring a first torque value of the control unit extracted from a communication signal in the autonomous driving mode and a second torque value of the control unit extracted from a signal generated according to the vehicle driving by the driver.

8. The method of claim 7, wherein the monitoring the information includes finalizing switching the driving mode of the vehicle when a difference between the first torque value and the second torque value is less than or equal to a predetermined value.

9. A control right switching system of switching a control right according to a driving mode of a vehicle, the control right switching system comprising:
    a control unit configured for controlling the vehicle;
    a manual driving control unit including a motor driven power steering (MDPS), an accelerator position sensor (APS) and a brake position sensor (BPS); and
    at least one processor electrically connected to the control unit and the manual driving control unit,
    wherein the at least one processor is configured for:
        receiving a command to switch the driving mode of the vehicle being in one of a manual driving mode or an autonomous driving mode;
        initializing a torque value of the control unit that controls the vehicle according to a current driving mode of the vehicle;
        transferring a driving mode control right of the vehicle from the vehicle to a driver or from the driver to the vehicle by increasing or reducing a vehicle control right to control the vehicle; and
        monitoring information obtained by the control unit in the vehicle whose driving mode was switched during a predetermined time period, and determining whether to switch the driving mode,
wherein the initializing the torque value includes:
determining whether the current driving mode of the vehicle is the autonomous driving mode,
initializing the manual driving control unit that controls driving of the vehicle in the manual driving mode when the at least one processor concludes that the current driving mode is the autonomous driving mode, and
initializing a torque of the MDPS to a heaviest torque and initializing a torque of the APS and the BPS to a torque of a state where the driver does not press down a pedal, when it is determined that the current driving mode is the manual driving mode.

10. The control right switching system of claim 9, wherein in the transferring the driving mode control right, the at least one processor is configured for reducing the vehicle control right.

11. The control right switching system of claim 10, wherein in the reducing the vehicle control right, the at least one processor is configured for:
reducing a torque of a steering wheel from a maximum value to a torque of the manual driving mode during a predetermined time period by the MDPS, and
increasing a torque of an accelerator pedal or a brake pedal from a minimum value to the torque in the manual driving mode during the predetermined time period by the APS and the BPS.

12. The control right switching system of claim 9, wherein in the transferring the driving mode control right, the at least one processor is configured for increasing the vehicle control right.

13. The control right switching system of claim 12, wherein the MDPS is configured to increase a torque of a steering wheel from a torque in the manual driving mode to a maximum value during a predetermined time period, and the APS and the BPS are configured to decrease a torque of an accelerator pedal or a brake pedal from the torque in the manual driving mode to a minimum value during the predetermined time period.

14. The control right switching system of claim 9, wherein in the monitoring the information, the at least one processor is configured for monitoring a first torque value of the control unit extracted from a communication signal in the autonomous driving mode and a second torque value of the control unit extracted from a signal generated according to the vehicle driving by the driver.

15. The control right switching system of claim 14, wherein in the monitoring the information, the at least one processor is configured for finalizing switching the driving mode of the vehicle when a difference between the first torque value and the second torque value is less than or equal to a predetermined value.

\* \* \* \* \*